UNITED STATES PATENT OFFICE.

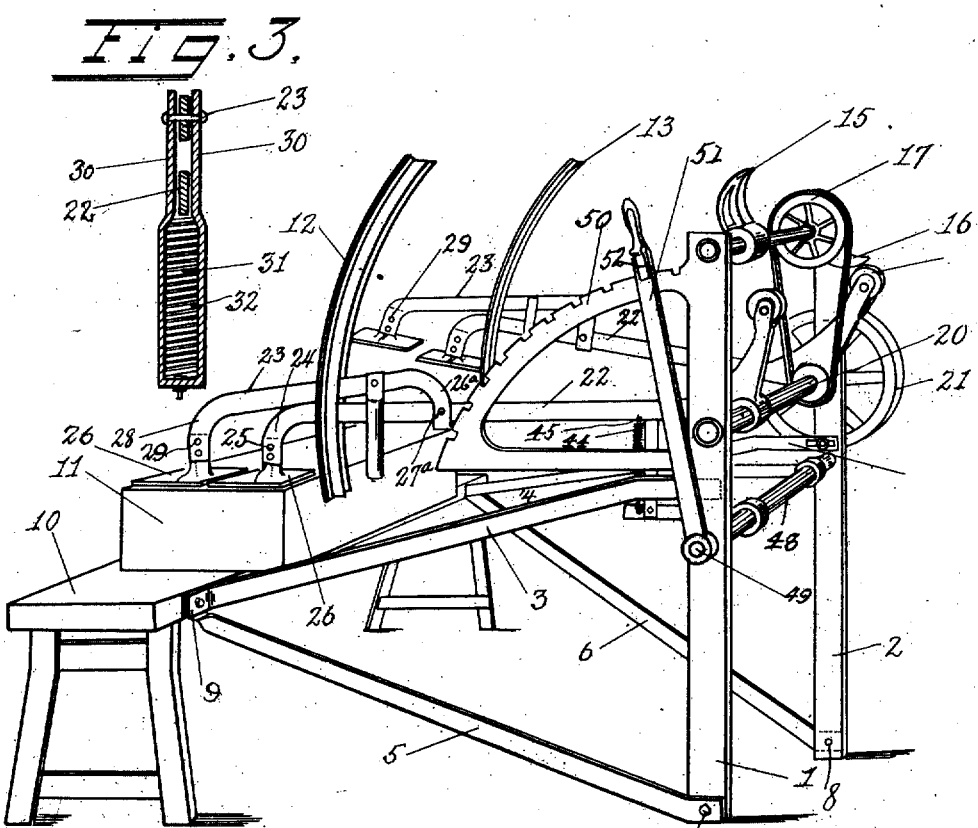

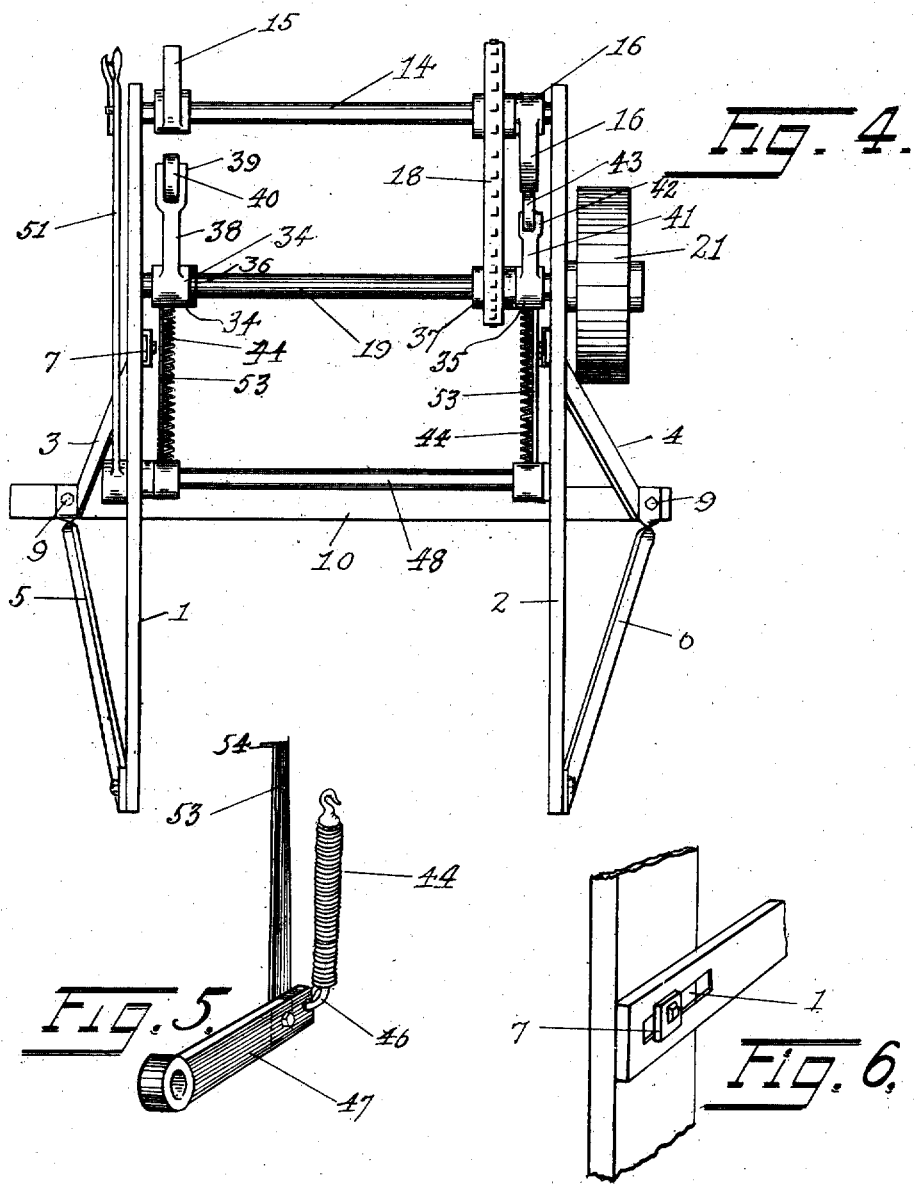

JOSEPH W. BRAGSTÄD, OF CANTON, SOUTH DAKOTA, ASSIGNOR TO THE BRAGSTAD BROS. CO., OF CANTON, SOUTH DAKOTA, A CORPORATION OF SOUTH DAKOTA.

TAMPING APPARATUS.

990,220. Specification of Letters Patent. Patented Apr. 25, 1911.

Application filed January 18, 1911. Serial No. 603,280.

*To all whom it may concern:*

Be it known that I, JOSEPH W. BRAGSTÄD, a citizen of the United States of America, residing at Canton, in the county of Lincoln and State of South Dakota, have invented certain new and useful Improvements in Tamping Apparatus, of which the following is a specification, reference being had therein to the accompanying drawing.

This invention relates to a tamping apparatus for use in connection with block molding machines and has for its object to provide an apparatus of such character in a manner as hereinafter set forth for efficiently tamping the constituents which form the molded block.

A further object of the invention is to provide a tamping apparatus for use in connection with block molding machines and provided with a means as hereinafter set forth whereby the elements of the apparatus can be shifted out of the way to allow of the removal of the molded block or to permit of the supplying of material to form the block to the mold of the block molding machine.

Further objects of the invention are to provide a tamping apparatus for use in connection with block molding machines, which is comparatively simple in its construction and arrangement, strong, durable, efficient in its use, conveniently operated, readily adjusted and set up with respect to the block molding machine, and comparatively inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings wherein like reference characters denote corresponding parts throughout the several views: Figure 1 is a perspective view of a tamping apparatus in accordance with this invention showing the adaptation thereof in connection with the block molding machine, Fig. 2 is a perspective view of one of the tamping heads, Fig. 3 is a detail illustrating means for elevating the upper head carrying arm of a pair of head carrying arms, Fig. 4 is a rear elevation of the apparatus, Fig. 5 is a detail illustrating the combined lifter and tension applying arm, Fig. 6 is a detail of the supporting frame.

The tamping apparatus in accordance with this invention includes a supporting frame formed of a pair of uprights 1, 2, a pair of upper braces 3, 4 and a pair of lower braces 5, 6. The braces 3, 4 are angularly disposed for a portion of their length, while the braces 5, 6 are angularly disposed with respect to the uprights 1, 2 and further extend upwardly at an inclination. The braces 3, 4 are adjustably connected as at 7 to the uprights 1, 2 intermediate the ends thereof and the braces 5, 6 are connected to the lower ends of the uprights 1, 2 as at 8. The braces 3, 5 at their inner ends are connected together by a hold-fast device 9, the latter also connects the said braces to the rear of the block molding machine, which is referred to generally by the reference character 10 and may be of any suitable construction. The braces 4, 6 are connected together and to the block molding machine 10 in the manner as the braces 3, 5. The braces 3 to 6 support the uprights 1, 2 rearwardly of and spaced from the machine 10. The mold of the machine 10 is indicated by the reference character 11 and to the rear wall of said mold a pair of vertically disposed curved guides 12, 13 are secured, these elements are utilized for guiding the supporting arms for the tamping heads which will be hereinafter referred to.

Rotatably mounted at the upper ends of the uprights 1, 2 is a shaft 14 having fixed thereto in proximity to each end a pair of oppositely disposed cams 15, 16 which are employed to assist in oscillating the tamping head supporting arms to be presently referred to. Fixed to the shaft 14 is a sprocket wheel 17, which is engaged by a transmission belt 18 whereby on the travel of said belt the shaft 14 will be revolved. Journaled for rotation within the uprights 1, 2 and below the shaft 14 is an operating shaft 19 provided with a sprocket wheel 20 over which the transmission belt 18 travels. The shaft 19 projects from the upright 2 and is provided with a pulley 21 connected in a suitable manner to a prime mover, although if desired the shaft can be operated in any suitable manner.

As shown the apparatus is provided with two pairs of tamping head supporting arms, but this number can be increased or diminished if desired. Each pair of tamping head supporting arms is of the same construction, so but one will be described, the description of one applies to the other. The supporting arms of each pair include what is termed an upper and lower supporting arm, the lower arm is indicated by the reference character 22 and the upper arm at 23. The forward end of the arm 22 is bent downwardly as at 24 and has fixedly connected thereto as at 25 a tamping head or hammer 26, the latter being provided with a vertically disposed apertured lug 27, which is connected as at 25 to the arm 22. The arm 23 at its rear is bent downwardly as at 26$^a$ and pivotally connected to the arm 22 at 27$^a$. The forward end of the arm 23 extends downwardly as at 28 and is fixedly connected to a tamping head or hammer 26, as at 29. Connected to the arm 23 forwardly of the portion 26$^a$ is a pair of depending members 30 which straddle the arm 22 as well as depend below said arm. The lower ends of the members 30 are formed integral with a casing 31 in which is arranged a coil spring 32. The function of the spring 32 and its supporting means is to hold the upper arm 23 to the lower arm. The upper and lower arms of one pair travel in the guide 12, while the upper and lower arms of the other pair travel in the guide 13. The arms of each pair during the operation of the tamping apparatus oscillate and the manner in which oscillations are imparted to each pair of arms will be presently referred to. The lower arm of one pair at its rear end is provided with a sleeve 34 loosely mounted upon the shaft 19 and the lower arm of the other pair at its rear end is provided with a sleeve 35 which is also loosely mounted upon the shaft 19. A stop collar 36 is provided to prevent the shifting of the sleeve 34 toward the sleeve 35 while shifting movement of the sleeve 35 toward the sleeve 34 is arrested by the hub 37 of the sprocket 20, said hub 37 being fixed to the shaft 19. Formed integral with the sleeve 34 is a vertically disposed crank arm 38 bifurcated at its upper end, as at 39 and carrying at its upper end a roller 40. The sleeve 35 has a vertically disposed crank arm 41 formed integral therewith and which has its upper end bifurcated, as at 42 and connected to the bifurcated end of the crank 41 is a roller 43. The arm 38 and its roller 40 associate with the cam 15 and the arm 41 and its roller 43 associate with the cam 16. The cams 15 and 16 during the rotation of the shaft 14 alternately engage the rollers 40, 43 whereby the crank arms 38 41 are shifted rearwardly and the pairs of tamping head supporting arms are elevated. Each pair of arms being alternately elevated with respect to each other. The elevation of the tamping head supporting arms is had against the action of the springs 44, which are connected at their upper ends as at 45 to the arms 22 and at their lower ends, as at 46 to the supporting members 47, which are fixed to the adjusting shaft 48, the latter being journaled in the uprights 1, 2 below the shaft 19 and has one end projecting therefrom as at 49.

Projecting forwardly from the upright 1 and at the upper portion thereof is a curved rack 50 which associates with an adjusting lever 51, the latter being fixed to the projecting end 49 of the shaft 48 and is provided with a spring pressed dog 52 for engagement with the teeth of the rack 50. When the lever 51 is swung forwardly, the members 47 are lowered thereby increasing tension in the springs 44. The lever 51 is maintained in adjusted position while the dog 52 engages in one of the teeth of the rack 50. When the lever 51 is swung backwardly tension of the springs 44 is relieved.

For throwing the supporting arms for the tamping heads out of operative position so that the rollers 43 will be clear of the path of the cams 15, 16, a pair of vertically disposed upwardly movable supports 53 are provided having their upper ends formed with lugs 54 positioned in alinement with the arms 22. The supports 53 are fixed to the members 47, so that when the lever 51 is swung rearwardly the supports 53 will move upwardly and the lugs 54 engage with the arms 22 elevating said arms and shifting the sleeves 34, 35 rearwardly whereby the rollers 40, 43 will be moved out of the path of the cams 15, 16 thereby discontinuing the oscillations of the tamping head supporting arms.

It is thought that the operation of the apparatus can be readily understood, but it will be stated that when the rollers 40, 43 are shifted in the path of the cams 15, 16 on a forward movement of the lever 51, said rollers 40, 43 will be engaged by the cams and the pairs of tamping head supporting arms will b ealternately elevated against the action of the springs 44 and when the cams 15, 16 pass clear of the rollers 40, 43, the springs 44 will pull the supporting arms downwardly, whereby these latter will in connection with the cams and springs be alternately oscillated and such operation will be continued as long as the shaft 19 is operated or as long as the rollers 40, 43 lie in the path of the cams 15, 16.

What I claim is:

1. A tamping apparatus for block molding machines comprising a plurality of pairs of tamping head supporting arms, one of said arms arranged over and depending forwardly of the other, a tamping head connected to the forward ends of each of the arms of said pairs of arms, means whereby each pair of arms is alternately operated, one of said arms of each pair of arms pivotally connected to the other arm of the pair, and a resilient connection between one of the arms of each pair and the other arm of the pair.

2. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, and resilient means whereby the pairs of arms are alternately lowered.

3. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, and means whereby the tension of said resilient means can be increased or diminished.

4. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, means whereby the tension of said resilient means can be increased or diminished, and a resilient connection between the upper arm and the lower arm of each pair of arms.

5. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, and means engaging with the lower arms of said pairs of arms for elevating them thereby moving the said arms to inoperative position.

6. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, means whereby the tension of said resilient means can be increased or diminished, and means engaging with the lower arms of said pairs of arms for elevating them thereby moving the said arms to inoperative position.

7. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, means whereby the tension of said resilient means can be increased or diminished, a resilient connection between the upper arm and the lower arm of each pair of arms, and means engaging with the lower arms of said pairs of arms for elevating them thereby moving the said arms to inoperative position.

8. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, means whereby the tension of said resilient means can be increased or diminished, means engaging with the lower arms of said pairs of arms for elevating them thereby moving the said arms to inoperative position, and a guide for each pair of arms.

9. A tamping apparatus for block molding machines comprising a plurality of pairs of tamping head supporting arms, each pair including an upper and a lower arm and with the upper arm pivotally connected to the lower arm, said upper arm projecting forwardly to the lower arm, a tamping head connected to the forward ends of each upper and each lower arm, means whereby the pairs of arms are alternately elevated, resilient means whereby the pairs of arms are alternately lowered, means whereby the tension of said resilient means can be increased or diminished, a resilient connection between the upper arm and the lower arm of each pair of arms, means engaging with the lower arms of said pairs of arms for elevating them thereby moving the said arms to inoperative position, and a guide for each pair of arms.

10. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, and a guide for each pair of arms.

11. A tamping apparatus for block molding machines comprising a plurality of pairs of tamping head supporting arms, each pair including an upper and a lower arm and with the upper arm pivotally connected to the lower arm, said upper arm projecting forwardly of the lower arm, a tamping head connected to the forward ends of each upper and each lower arm, means whereby the pairs of arms are alternately elevated, resilient means whereby the pairs of arms are alternately lowered, means whereby the tension of said resilient means can be increased or diminished, and a guide for each pair of arms.

In testimony whereof I affix my signature in the presence of two witnesses.

JOSEPH W. BRAGSTÄD.

Witnesses:
J. G. LAXSON,
E. M. DEAN.

---

Copies of this patent may be obtained for five cents each, by addressing the "Commissioner of Patents, Washington, D. C."